Patented Apr. 5, 1949

2,466,399

UNITED STATES PATENT OFFICE 2,466,399

THERMOSETTING POLYVINYL ACETAL COMPOSITION

Richard D. Dunlop, Longmeadow, Mass., assignor to Monsanto Chemical Company, St. Louis, Mo., a corporation of Delaware No Drawing. Application October 15, 1943, Serial No. 506,349

4 Claims. (Cl. 260—45.1)

This invention relates to improved compositions containing polyvinyl acetal resins and more particularly to improved compositions containing polyvinyl acetal resins and phenol aldehyde condensation products.

Polyvinyl acetal resins and their plasticized compositions remain soluble and thermoplastic over wide ranges of temperature. It has been suggested that combinations of polyvinyl acetal resins and phenol formaldehyde resins be prepared and that such combinations be rendered infusible and insoluble by heat treatment. However, extensive heat treatment is required to reduce the plasticity and solubility of such combinations sufficiently to meet many requirements.

It is an object of this invention to prepare improved compositions containing polyvinyl acetal resins. A further object is to prepare compositions containing polyvinyl acetal resins and phenol aldehyde resins which possess a rapid curing rate. A particular object is to prepare compositions containing polyvinyl acetal resins and phenol aldehyde resins which cure rapidly to form transparent, infusible, insoluble products.

According to the present invention, improved compositions are prepared by combining aminotriazine-aldehyde reaction products with compositions comprising polyvinyl acetal resins and phenol aldehyde condensation products. More particularly, according to this invention, compositions are prepared which cure rapidly to form transparent, infusible, insoluble products by combining melamine-formaldehyde etherified reaction products with combinations of polyvinyl acetal resins and phenol aldehyde resins miscible therewith.

Polyvinyl acetal resins may be prepared, for example, by hydrolyzing a polyvinyl ester, for example, polyvinyl acetate, and then reacting the resulting hydrolysis product with an aldehyde. These resins may contain a certain proportion of ester and hydroxyl groups in addition to the acetal groups. U. S. patent to Morrisson et al. Re. 20,430, dated June 20, 1937, illustrates suitable methods for preparing such resins. The polyvinyl acetal resins may be made from various aldehydes or mixtures thereof, or even from ketones containing an active carbonyl group. Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. In general, polyvinyl acetal resins made from saturated lower aliphatic aldehydes are preferred. In particular, polyvinyl acetal resins made with saturated aliphatic aldehydes containing less than 6 carbon atoms and especially those made with formaldehyde, acetaldehyde and butyraldehyde and mixtures thereof are preferred. When the polyvinyl acetal resins contain ester groups, the nature of the ester groups may be substantially varied, but are preferably residues of saturated lower aliphatic acids such as formic acid, acetic acid, propionic acid and butyric acid. The degree of polymerization of the polyvinyl esters used in making the polyvinyl acetals, as evidenced by the viscosity of solutions thereof may be substantially varied, for example, the viscosities of 1 molar benzene solutions at 20° C. may vary from 5–75 centipoises. In making the polyvinyl acetal resins, from about 30 to about 95% of the ester groups in the original polyvinyl esters are replaced by acetal groups.

According to one embodiment of this invention, the polyvinyl acetal resins employed contain, on a weight basis, at least 5% hydroxyl groups calculated as polyvinyl alcohol, and preferably from 5–25% hydroxyl groups. These resins may also contain from 0–40% ester groups calculated as polyvinyl ester, the ester groups preferably being acetate.

According to one embodiment of this invention, when the acetal groups are butyraldehyde acetal, the resins employed may be considered to be made up, on a weight basis, of 12–22% hydroxyl groups calculated as polyvinyl alcohol, 15–30% acetate groups calculated as polyvinyl acetate, and the balance substantially butyraldehyde acetal. According to another embodiment of this invention, when the acetal groups are butyraldehyde acetal, the resins employed may be considered to be made up, on a weight basis, of 12–22% hydroxyl groups calculated as polyvinyl alcohol and less than 3% acetate groups calculated as polyvinyl acetate and the balance substantially butyraldehyde acetal.

According to one embodiment of this invention, when the acetal groups are acetaldehyde acetal, the polyvinyl acetal resin employed may be considered to be made up, on a weight basis, of 5–15% hydroxyl groups calculated as polyvinyl alcohol, 15–20% acetate groups calculated as polyvinyl acetate and the balance substantially acetaldehyde acetal.

According to one embodiment of this invention, when the acetal is formaldehyde acetal, the polyvinyl acetal resin may be considered to be made up, on a weight basis, of 5–10% hydroxyl groups calculated as polyvinyl alcohol, 8–15% acetate groups calculated as polyvinyl acetate and the balance substantially formaldehyde acetal.

An example of a mixed acetal resin is one containing, on a weight basis, 13% hydroxyl groups calculated as polyvinyl alcohol, 2–6% acetate groups calculated as polyvinyl acetate and the balance 65–50 mol per cent acetaldehyde acetal and 35–50 mol per cent butyraldehyde acetal.

The aminotriazine-aldehyde reaction products employed according to this invention may comprise aminotriazine-aldehyde addition products or condensation products of these addition products, or ether derivatives of the foregoing. Melamine formaldehyde reaction products, for example, may be prepared by reacting formaldehyde and melamine in the proper molecular proportions, preferably under alkaline conditions. Melamine formaldehyde addition products comprise methylol derivatives of malamine or mixtures thereof. Thus, mono-, di-, tri-, tetra-, penta- and hexamethylol melamines or mixtures thereof may be prepared. The number of methylol groups formed on the melamine molecule depends primarily on the molecular ratio of formaldehyde reacted with melamine and the extent of the condensation of the methylol compounds depends on the temperature at which the reaction is carried out and on the duration of the reaction. In general, the reaction between melamine and formaldehyde should be sufficient to product a clear reaction product when a 37% aqueous solution of formaldehyde is employed. In some instances, it may be desirable to continue the reaction until a precipitate is formed when a portion of the reaction mixture is passed into ice water. However, excessive condensation of the methylol compounds is to be avoided, i. e., formation of infusible, insoluble condensation products.

According to one embodiment of this invention, the melamine formaldehyde reaction product employed is prepared by reacting at least two molecules of formaldehyde with each molecule of melamine at a pH of substantially 8–10 until a clear reaction mixture is formed. Thereafter, the reaction mixture is diluted with an equal volume of water and allowed to cool. On cooling, a crystalline product is formed which, after separation by filtration is found to be substantially the methylol melamine corresponding to the molecular ratio of formaldehyde to melamine employed.

Etherified melamine formaldehyde reaction products may be prepared by reacting melamine, formaldehyde and an alcohol, preferably a monohydric alcohol. According to one embodiment of this invention, the ethers are prepared by reacting the melamine formaldehyde reaction products described above with a monohydric alcohol.

The following is one method by which ethers of methylol melamines may be prepared. Melamine and formaldehyde are reacted in the desired molar ratio, for example, 3 mols of formaldehyde in an aqueous 37% solution for each mol of melamine, in the presence of sufficient sodium hydroxide to produce initially a pH of 9.3 (glass electrode). The reaction is carried out with agitation at atmospheric pressure at a temperature of substantially 80–90° C. As soon as the mixture becomes clear, indicating that the melamine has reacted, the solution is diluted with an equal volume of water and allowed to cool. On cooling a crystalline product is formed which is separated by filtration. The crystalline product is found to be substantially trimethylol melamine when a molar ratio of formaldehyde to melamine of 3:1 is used. If a 4:1 molar ratio of formaldehyde to melamine is used, the product is substantially tetramethylol melamine.

The crystalline product obtained as described above is treated with ethyl alcohol in substantial excess of the amount needed to react with all of the methylol groups present, for example, five times the theoretical amount at a temperature of about 40° C. after the addition of sufficient phosphoric acid to produce a pH of about 4–5. The reaction is continued until a clear solution is formed and thereafter the pH of the solution is adjusted by the addition of sodium hydroxide to about 8.3 (phenol phthalein indicator). Then the solution is cooled to about 25° C. whereupon a precipitate is formed comprising sodium phosphate crystals. These crystals are separated by filtration and the filtrate concentrated by vacuum distillation to the desired solids content, for example, about 70% solids. This resulting product comprises essentially an alcohol paste or slurry of the ether of the methylol melamine, in this case substantially triethyl ether of trimethylol melamine.

Other methods for preparing etherified amino-triazine-formaldehyde reaction products are set forth in my co-pending application Ser. No. 495,603, filed July 21, 1943 now Patent No. 2,453,308 of Nov. 9, 1948.

Included within the scope of this invention are various methylol melamine ethers. According to one embodiment of this invention, the ethers employed are alkyl ethers, of di-, tri-, tetra-, penta-, and hexamethylol melamine, or mixtures thereof, in which the alkyl radical contains less than 7 carbon atoms. Examples of such ethers are the di-, tri-, tetra-, penta and hexaethyl ethers of di-, tri-, tetra-, penta- and hexamethylol melamines, respectively, tri-propyl, tributyl, tri-hexyl and tri-amyl ethers of tri-methylol melamine. A particular embodiment of this invention comprises the use of the ethyl ethers of tri-, tetra-, penta-, and hexamethylol melamine or mixtures thereof.

The phenol aldehyde condensation products employable according to this invention may be substantially varied in their composition and method of preparation. For example, oil soluble resins prepared from para-tertiary butyl phenol, para-tertiary amyl phenol or para-tertiary phenyl phenol and formaldehyde may be employed, particularly when transparent products are desired. Compositions that are more rapidly converted into the insoluble, infusible state are obtained when the phenolic condensation product is made from a phenol unsubstituted in both the ortho and para positions, for example, phenol, resorcinol, meta cresol and 1,3,5-xylenol. Other phenols that may be employed include ortho cresol and para cresol.

While formaldehyde, particularly aqueous solutions of formaldehyde (or compounds engendering formaldehyde) is the preferred aldehyde, other aldehydes are included within the scope of this invention, for example, aliphatic aldehydes such as acetaldehyde, propionaldehyde, butyraldehyde, heptaldehyde, hexaldehyde, furfural; unsaturated aldehydes such as acrolein or methacrolein; aromatic aldehydes such as benzaldehyde; and mixtures of aldehydes. Generally, substantially equal molecular proportions of the phenol and the aldehyde are employed, although when desired up to 3 molecular proportions of the aldehyde may be employed for each molecular proportion of the phenol. The use of phenol aldehyde resins prepared under alkaline conditions promotes conversion to the insoluble, infusible state, particularly when the molecular ratio of formaldehyde to phenol does not substantially exceed 1:1. Thus, the phenol and the aldehyde may be reacted in the presence of sodium hydroxide, ammonia, barium hydroxide or quaternary ammonium hydroxides such as dimethyl dibenzyl ammonium hydroxide or tetraethanol ammonium hydroxide when alkaline conditions are desired. When acid conditions are desired such substances as sulphuric acid, hydrochloric acid and oxalic acid may be used.

The following are specific examples illustrative of the present invention, but not limitative thereof. Parts are parts by weight.

The polyvinyl butyraldehyde acetal resin employed in the following examples is made from polyvinyl acetate having a viscosity of about 55 centipoises in a 1 molar benzene solution at 20° C. The polyvinyl acetal resin contains 16–20% hydroxyl groups by weight calculated as polyvinyl alcohol, less than 3% acetate groups calculated as polyvinyl acetate and the balance substantially butyraldehyde acetal.

EXAMPLE I

| | Parts |
|---|---|
| Polyvinyl butyraldehyde acetal resin | 100 |
| Butyl ricinoleate | 50 |
| Plasticizer SC[1] | 17 |
| Phenolic resin[2] | 10 |
| Tetraethyl ether of tetra methylol melamine | 0.5 |

[1] A glycol ester of vegetable oil acids. Other plasticizers such as dibutyl sebacate or triethylene glycol dihexoate may be used.
[2] An oil soluble resin made by reacting substantially equal molecular proportions of para-tertiary butyl phenol and formaldehyde under alkaline conditions.

The polyvinyl acetal resin and the plasticizers are mixed in a Banbury mixer at a temperature of 100–120° C. until a homogeneous plastic mass is formed and then the phenolic resin is thoroughly mixed in. Thereafter, the tetraethyl ether of tetramethylol melamine is added after cooling the plastic mass to about 80° C. The resulting product is a homogeneous, transparent rubbery plastic mass capable of being molded, extruded, calendered or dissolved in solvents to form coating compositions. On heating the product is converted into an insoluble, infusible material. Thus, after heating at 130° C. for 60 minutes, the product is no longer soluble in such solvents as ethanol and ethyl acetate in which the unheated plastic readily dissolves. Transparent, solvent-resistant plastic tubes may be formed by extruding the product described above at a temperature of about 95° C. followed by heating at 130° C. for 60 minutes.

EXAMPLE II

| | Parts |
|---|---|
| Polyvinyl butyraldehyde acetal resin | 100 |
| Butyl ricinoleate | 50 |
| Plasticizer SC | 17 |
| Phenolic resin[1] | 10 |
| Zinc oxide | 25 |
| Stearic acid | 1 |

[1] The same phenolic resin as employed in Example I.

A plastic composition is made from the above ingredients in a manner similar to that described in Example I. The resulting composition is calendered onto duck cloth at a temperature of about 100° C. Thereafter, a plastic coating is skim-coated onto the first coating at a temperature of 90° C. to 105° C. This latter coating is identical with the first coating except that 0.6 part of tetraethyl ether of tetramethylol melamine is included in the composition. The resulting coated cloth may be formed into any desired article as, for example, a pontoon, and thereafter, the plastic coating converted into an insoluble, infusible state by heating at 130° C. for 60 minutes. In contrast to similar products in which no tetraethyl ether of tetramethylol melamine is included in the skim-coat, there is no bubble formation between the two coatings and no slippage at the seams during the heat treatment of the pontoon or other article formed from the coated product.

The following example illustrates compositions made according to the present invention in which are included substantial quantities of fillers such as carbon black, whiting and the like.

EXAMPLE III

| | Parts |
|---|---|
| Polyvinyl butyraldehyde acetal resin | 100 |
| Butyl ricinoleate | 50 |
| Plasticizer SC | 17 |
| Phenolic resin[1] | 10 |
| Zinc oxide | 25 |
| Stearic acid | 1 |
| Lamp black | 55 |
| Tetraethyl ether of tetramethylol melamine | 0.6 |

[1] The same phenolic resin as employed in Example I.

The above ingredients are formed into a plastic composition in the same manner as that employed in Example I. In order to demonstrate the advantageous characteristics of this composition, sheets 0.020″ in thickness are prepared and cured by heating at 130° C. for 60 minutes. The resulting sheets are found to have tensile strengths at 71° C. 7–8 times as great as the tensile strengths of similar sheets containing only 5 parts of lamp black.

To further demonstrate the advantageous properties of the composition of this example, seams with a 2″ overlap are prepared by pressing together at about 95° C. a composite consisting of two sheets of duck cloth with a sheet of above described plastic 0.020″ thick between the two sheets of cloth and a similar plastic sheet on the outside of each sheet of cloth. The resulting seams are cured by heating for one hour at about 95° C., followed by two hours at 105° C., and finally for two hours at 121° C. It is found that seams prepared in this manner from the composition of this example show a slip of only about ⅛″ when subjected to a force of 50 pounds per inch width of seam for twenty-four hours at about 95° C., whereas seams prepared from similar compositions containing only 5 parts of carbon black completely pull apart in about one-half hour under the same conditions.

The unexpected and surprising effects resulting from the inclusion of methylol melamine ethers in compositions comprising polyvinyl acetal resins and phenolic resins is further demonstrated by the flow values given in the table below. The plastic employed is the same as that described in Example II except that the amount of the tetraethyl ether of tetramethylol melamine is varied as indicated in the table. The flow values are obtained on the Rossi-Peakes flow tester (A. S. T. M. D569–41T) at 107° C. and 100 pounds per square inch pressure.

Table

| Heat treatment | Amount of tetraethyl ether of tetramethyl melamine | | | |
|---|---|---|---|---|
| | None | 0.5 parts | 1.5 parts | 5.0 parts |
| None | 1.18 | 0.68 | 1.09 | 1.13 |
| ½ hour at 82° C | 1.27 | | 0.70 | 0.24 |
| 1½ hours at 82° C | 1.02 | | 0.24 | 0.02 |
| 4 hours at 82° C | 1.10 | | 0.04 | 0.00 |
| 16 hours at 82° C | 0.48 | | 0.02 | 0.00 |
| ¼ hour at 99° C | 1.02 | 0.14 | 0.11 | 0.02 |
| ½ hour at 99° C | 0.85 | 0.09 | 0.05 | 0.00 |
| 1 hour at 99° C | 0.65 | 0.06 | 0.03 | 0.00 |
| ¼ hour at 110° C | 0.82 | | 0.05 | 0.00 |
| ½ hour at 110° C | 0.62 | | 0.04 | 0.00 |
| 1 hour at 110° C | 0.44 | | 0.02 | 0.00 |

In general, plastic compositions possessing flow values as given in the above table of 0.20 or less are classed as thermoset. Thus, such products are not only substantially infusible, but are insoluble in solvents, for the non-heat treated material. From the foregoing, the valuable and unexpected effect of amino-triazine-aldehyde reaction products on compositions containing polyvinyl acetal resins and phenol-aldehyde resins is clearly illustrated by the above table.

The following is an example illustrating the use of a non-etherified aminotriazine-aldehyde reaction product.

EXAMPLE IV

| | Parts |
|---|---|
| Polyvinyl butyraldehyde acetal resin | 100 |
| Butyl ricinoleate | 50 |
| Plasticizer SC | 17 |
| Phenolic resin¹ | 10 |
| Trimethylol melamine | 0.5 |

¹ The same phenolic resin as employed in Example I.

The above ingredients are formed into a plastic composition by mixing in a Banbury mixer the polyvinyl butyraldehyde resin and the plasticizers and then incorporating the phenolic resin and finally adding the trimethylol melamine. The resulting composition is rapidly converted into an infusible, insoluble form at elevated temperatures.

EXAMPLE V

Example I is repeated except that the phenolic resin employed is one prepared by reacting substantially equimolecular proportions of phenol and formaldehyde under alkaline conditions. The product obtained is rapidly converted into an infusible, insoluble form at elevated temperatures.

EXAMPLE VI

Example I is repeated except that the amount of the tetraethyl ether of tetramethylol melamine employed is increased to 5 parts. The product obtained is converted into an infusible, insoluble product at an extremely rapid rate.

As pointed out hereinbefore, the composition of the polyvinyl acetal resin employed may be substantially varied. For example, the polyvinyl acetal resin employed in the above examples may be replaced by either of the following polyvinyl acetal resins to produce a plastic composition that may be rapidly converted into an insoluble, infusible state at elevated temperatures.

(1) A polyvinyl formaldehyde acetal resin made from polyvinyl acetate having a viscosity of 15–20 centipoises at 20° C. in a 1 molar benzene solution and which may be considered to be made up on a weight basis of 8% hydroxyl groups calculated as polyvinyl alcohol, 12% acetate groups calculated as polyvinyl acetate and the balance substantially formaldehyde acetal.

(2) A polyvinyl acetaldehyde acetal resin made from polyvinyl acetate having a viscosity of 10–15 centipoises at 20° C. in a 1 molar benzene solution and which may be considered to be made up on a weight basis of 7% hydroxyl groups calculated as polyvinyl alcohol, 17% acetate groups calculated as polyvinyl acetate and the balance substantially acetaldehyde acetal.

According to one embodiment of this invention, the methylol melamine ethers contain a sufficient number of etherified methylol groups to give a clear solution in an organic solvent, for example, in the etherifying alcohol employed. Two to six etherified methylol groups for each molecule of melamine are generally required. According to another embodiment, the methylol melamine ethers employed are the result of substantially completely etherifying methylol melamine products containing two to six methylol groups.

The amount of aminotriazine aldehyde reaction product incorporated in the compositions of this invention may be substantially varied. As little as 0.1% based on the polyvinyl acetal resin produces a marked effect on the curing rate of the product. Generally, from 0.3% to 5.0% is advantageously employed, although much higher quantities, for example, 20–25% may be desirable for certain purposes.

The manner in which the aminotriazine aldehyde reaction products are incorporated into the compositions of this invention may be substantially varied. For example, ethers of melamine formaldehyde condensation products may be added in solution in organic solvents, for example, in solution in the etherifying alcohol employed or as a paste or slurry therewith, or in a molten condition or in the solid state.

The amount of phenol aldehyde reaction product employed according to this invention may be substantially varied, but from 5 to 25% is found to be especially desirable.

Preferably, the compositions of this invention include a plasticizer for the polyvinyl acetal resin but when advantageous the plasticizer may be omitted. In place of butyl ricinoleate employed in the examples given hereinbefore, may be employed dibutyl sebacate, triethylene glycol dihexoate, the dimethyl amide of acids derived from castor oil, butyl phthalate and the like.

Included within the scope of this invention are ethers of amino-triazine-aldehyde reaction products in which the residue of the alcohols or other substances employed in preparing the ethers vary widely in their chemical structures. Thus, the residues may comprise aliphatic, aromatic, aliphatic-aromatic, aromatic-aliphatic, hydro-aromatic and heterocyclic radicals. As examples of such radicals may be mentioned ethyl, propyl, butyl, amyl, phenyl, benzyl, toluyl, lauryl, cetyl, allyl, stearyl, oleyl, furfuryl, cyclohexyl and the like. When the ethers are made from alcohols, monohydric or polyhydric alcohols or mixtures thereof may be employed, although monohydric alcohols are preferred. Examples of such alcohols are methyl alcohol, ethyl alcohol, propyl alcohol, butyl alcohol, ethyl butanol, ethyl hexanol, lauryl alcohol, stearyl alcohol, benzyl alcohol, ethylene glycol, diethylene glycol, glycerol, sorbitol, terpineol, furfuryl alcohol and the like.

A preferred group of ethers comprises alkyl ethers of methylol melamine, particularly those in which the alkyl group is one containing less than 7 carbon atoms. When desired, the alkyl groups may be substituted, for example, with halogen atoms. Examples of such substituted groups are mono-, di-, and trichloro-ethyl, -propyl, -butyl, and -amyl radicals.

Included within the scope of this invention are other aldehyde reactable aminotriazines than melamine. Examples of other aminotriazines include substituted melamines, for example, chlorinated, alkylated, or phenylated melamines, deaminated melamines, for example, ammeline, ammelide and the like. Other examples of aminotriazines are 2,4,6-triethyl and triphenyl-triamino-1,3,5-triazines, 2,4,6-trihydrazino-1,3,5-triazine, and the corresponding condensed triazines such as melam and melem, 2-amino-1,3,5-triazine, 2-chloro-4,6-diamino-1,3,5-triazine, 2-phenyl-4-amino-6-hydroxyl-1,3,5-triazine and 6-methyl-2,4-diamino-1,3,5-triazine. Mixtures of amino-triazines are also included within the scope of this invention. When the particular aminotriazine employed contains less than 6 aldehyde-replaceable hydrogen atoms, the upper limit of the proportion of formaldehyde employed may be reduced. In general, when thermosetting products are desired, it is preferred that the aminotriazine have at least two aldehyde-replaceable hydrogen atoms attached to the aminido nitrogen atoms.

While formaldehyde (or compounds engendering formaldehyde), particularly aqueous solutions of formaldehyde, is the preferred aldehyde employed for reaction with melamine or other aminotriazine, other aldehydes are included within the scope of this invention. As examples may be mentioned, aliphatic aldehydes such as acetaldehyde, propionaldehyde, butyraldehyde, heptaldehyde, hexaldehyde and furfural; unsaturated aldehydes such as acrolein, methacrolein and crotonaldehyde; aromatic aldehydes such as benzaldehyde; and mixtures of the foregoing aldehydes. Thus, the ethers may be prepared from the reaction products of aminotriazines and aldehydes broadly. A particular group of aminotriazine-aldehyde addition products are those prepared from aliphatic aldehydes which may be termed alkylol-aminotriazines and particularly contemplated are those alkylol-aminotriazines in which the alkyl group contains less than 7 carbon atoms.

The compositions of the present invention illustrated by the compositions described in the examples may be employed for various uses and in particular for those uses wherein the thermosetting characteristics of these products are advantageous. Particularly valuable are the compositions wherein ethers of aminotriazine-aldehyde reaction products are employed which form transparent products with polyvinyl acetal resins and phenolic resins compatible therewith, as for example, oil soluble phenolic resins. Such products are illustrated by the composition described in Example I. Among uses for the compositions of the present invention may be mentioned their use in forming molded products; in forming transparent sheets, rods and tubes; as interliners for laminated glass; for coating or cementing materials such as wood, cloth, or other textiles, paper and glass sheets, glass fibers, metals, articles made from plastic materials, such as those made from synthetic resins and the like. Products prepared according to this invention may be substituted for rubber for many purposes, as for example, in place of rubber tubing.

Among the fillers which may be employed in conjunction with the compositions of this invention may be mentioned wood flour, carbon black, powdered mica, silica and the like. For coloring purposes, dyestuffs and pigments may be incorporated in the usual manner. The zinc oxide employed in the above examples to further accelerate the conversion of the plastic compositions to the insoluble, infusible state may be replaced by other accelerating ingredients as, for example, borax, salicylic acid or other metal oxides such as magnesium oxide (MgO), or tin oxide (SnO).

What is claimed is:

1. A thermosetting composition comprising a mixture of 100 parts of a polyvinyl butyraldehyde acetal resin containing on a weight basis 16 to 20% hydroxyl groups calculated as polyvinyl alcohol, less than 3% acetate groups calculated as polyvinyl acetate and the balance substantially butyraldehyde acetal, 5-25 parts of an oil-soluble monohydric, para-substituted butyl phenol-formaldehyde resinous condensation product, and 0.1-0.6 part of a thermosetting ethyl ether of a methylol melamine miscible therewith.

2. A composition as defined in claim 1 in which the ether is an ethyl ether of tetramethylol melamine.

3. A transparent thermoset composition of matter comprising the product resulting from heat-reacting the composition defined in claim 1.

4. A thermosetting composition comprising 100 parts of a polyvinyl butyraldehyde acetal resin containing on a weight basis 16-20% hydroxyl groups calculated as polyvinyl alcohol, 5-25 parts of a thermosetting phenolaldehyde condensation product, 55 parts of lamp black and from 0.1-5.0 parts of a thermosetting ethyl ether of a methylol melamine.

RICHARD D. DUNLOP.

REFERENCES CITED

The following references are of record in the file of this patent:

UNITED STATES PATENTS

| Number | Name | Date |
|---|---|---|
| 2,197,357 | Widmer et al. | Aug. 16, 1940 |
| 2,262,728 | Swain et al. | Nov. 11, 1941 |
| 2,307,588 | Jackson et al. | Jan. 5, 1943 |
| 2,326,698 | Swain et al. | Aug. 10, 1943 |
| 2,374,067 | Alderson | Apr. 17, 1945 |
| 2,375,838 | Coolidge et al. | May 15, 1945 |
| 2,387,256 | Groten | Oct. 23, 1945 |
| 2,396,098 | Haas | Mar. 5, 1946 |
| 2,402,075 | Novotny | June 11, 1946 |
| 2,402,910 | Novak | June 25, 1946 |

OTHER REFERENCES

Pages 1-3, "Amberol," pub. Apr. 1941, by Resinous Products & Chem. Co., Phila.

Pages 47 and 51, "Uformite," pub. Apr. 1941, by Resinous Products & Chem. Co., Phila.

Pages 2 and 3, "The Resinous Reporter," vol. 4, No. 2, May 1943.

Gams et al.; British Plastics, pages 508-511 and 518-520, Feb. 1943.